United States Patent
Brombach

(10) Patent No.: US 11,322,943 B2
(45) Date of Patent: May 3, 2022

(54) METHOD FOR CONTROLLING THE RESTORATION OF A NETWORK

(71) Applicant: Wobben Properties GmbH, Aurich (DE)

(72) Inventor: Johannes Brombach, Berlin (DE)

(73) Assignee: Wobben Properties GmbH, Aurich (DE)

(*) Notice: Subject to any disclaimer, the term of this patent is extended or adjusted under 35 U.S.C. 154(b) by 494 days.

(21) Appl. No.: 16/471,343

(22) PCT Filed: Dec. 5, 2017

(86) PCT No.: PCT/EP2017/081518
§ 371 (c)(1),
(2) Date: Jun. 19, 2019

(87) PCT Pub. No.: WO2018/114324
PCT Pub. Date: Jun. 28, 2018

(65) Prior Publication Data
US 2020/0381921 A1    Dec. 3, 2020

(30) Foreign Application Priority Data
Dec. 19, 2016 (DE) .................... 10 2016 124 840.1

(51) Int. Cl.
*F03D 9/00* (2016.01)
*H02P 9/04* (2006.01)
(Continued)

(52) U.S. Cl.
CPC .............. *H02J 3/381* (2013.01); *F03D 7/048* (2013.01); *H02H 7/262* (2013.01); *H02J 3/004* (2020.01);
(Continued)

(58) Field of Classification Search
CPC ...... H02J 3/004; H02J 3/381; H02J 13/00006; H02J 13/00034; H02J 13/0004;
(Continued)

(56) References Cited

U.S. PATENT DOCUMENTS

| 7,638,893 B2 | 12/2009 | Wobben |
| 8,000,840 B2 | 8/2011 | Nielsen |

(Continued)

FOREIGN PATENT DOCUMENTS

| CN | 105846462 A | 8/2016 |
| DE | 102005018996 A1 | 10/2006 |

(Continued)

*Primary Examiner* — Tulsidas C Patel
*Assistant Examiner* — Thomas K Quigley
(74) *Attorney, Agent, or Firm* — Seed Intellectual Property Law Group LLP

(57) ABSTRACT

A method for controlling the rebuilding of an electrical supply network, wherein the electrical supply network has a first network section and at least one further network section, at least one wind farm is connected to the first network section, the wind farm can be controlled via a wind farm control room, the first network section is coupled to the at least one further network section via at least one switching device in order to transmit electrical energy between the network sections, the at least one switching device is set up to disconnect the first network section from the at least one further network section in the event of a fault, a network control station is provided for the purpose of controlling the at least one switching device, wherein, in the event of a fault during which a network fault acting on the first network section occurs, the first network section is disconnected from the at least one further network section by the at least one switching device, the wind farm control room interchanges data with the network control station via a control room connection, wherein the control room connection is a failsafe communication connection between the wind farm
(Continued)

control room and the network control station and can be operated independently of the electrical supply network, in particular can be operated even in the case of the fault in the first network section, and the wind farm receives data from the network control station via a wind farm connection, wherein the wind farm connection is a failsafe communication connection between the wind farm and the network control station and can be operated independently of the electrical supply network, in particular can be operated even in the case of the fault in the first network section, and further data which are not transmitted via the control room connection and are not transmitted via the wind farm connection are transmitted via a further data connection provided that the latter has not failed.

20 Claims, 3 Drawing Sheets

(51) Int. Cl.
  *H02J 3/38* (2006.01)
  *H02J 13/00* (2006.01)
  *H02J 3/00* (2006.01)
  *F03D 7/04* (2006.01)
  *H02H 7/26* (2006.01)

(52) U.S. Cl.
  CPC .... *H02J 13/0004* (2020.01); *H02J 13/00006* (2020.01); *H02J 13/00034* (2020.01); *F05B 2260/8211* (2013.01); *F05B 2270/32* (2013.01); *H02J 2300/28* (2020.01)

(58) Field of Classification Search
  CPC ...... H02J 2300/28; F03D 7/048; H02H 7/262; F05B 2260/8211; F05B 2270/32
  See application file for complete search history.

(56) References Cited

U.S. PATENT DOCUMENTS

| | | | |
|---|---|---|---|
| 8,378,515 B2 | 2/2013 | Fortmann | |
| 8,694,171 B2 | 4/2014 | Ichinose et al. | |
| 9,035,480 B2* | 5/2015 | Fortmann | H02J 3/46 290/44 |
| 9,124,138 B2 | 9/2015 | Mori et al. | |
| 9,584,054 B2 | 2/2017 | Kosaka et al. | |
| 9,742,191 B2 | 8/2017 | Beekmann | |
| 10,270,287 B2 | 4/2019 | Beekmann | |
| 10,396,695 B2* | 8/2019 | Ganireddy | H02P 9/007 |
| 2004/0010350 A1* | 1/2004 | Lof | H02J 3/24 700/292 |
| 2008/0118354 A1 | 5/2008 | Jeppesen et al. | |
| 2010/0060000 A1 | 3/2010 | Scholte-Wassink | |
| 2010/0061852 A1* | 3/2010 | Potter | F03D 9/11 416/31 |
| 2011/0082596 A1* | 4/2011 | Meagher | H02J 13/00001 700/291 |
| 2013/0038123 A1* | 2/2013 | Wilkins | H02J 13/0079 307/18 |
| 2013/0054957 A1* | 2/2013 | Boring | H04L 63/123 713/150 |
| 2014/0297206 A1 | 10/2014 | Silverman | |
| 2015/0304278 A1* | 10/2015 | Johnson | H04L 63/02 726/11 |
| 2015/0369217 A1 | 12/2015 | Gupta et al. | |
| 2016/0131109 A1 | 5/2016 | Busker | |

FOREIGN PATENT DOCUMENTS

| | | |
|---|---|---|
| DE | 102007035391 A1 | 2/2009 |
| DE | 102007049251 A1 | 4/2009 |
| EP | 1993184 A1 | 11/2008 |
| EP | 2275674 A2 | 1/2011 |
| JP | 2002101555 A | 4/2002 |
| JP | 2006280020 A | 10/2006 |
| JP | 2013013178 A | 1/2013 |
| JP | 2014082861 A | 5/2014 |
| JP | 2015165753 A | 9/2015 |
| RU | 2597235 C2 | 9/2016 |
| WO | 2012/056564 A1 | 5/2012 |
| WO | 2016/120260 A1 | 8/2016 |

* cited by examiner

METHOD FOR CONTROLLING THE RESTORATION OF A NETWORK

BACKGROUND

Technical Field

The present invention relates to a method for controlling the rebuilding of an electrical supply network. The present invention also relates to a communication device for controlling the rebuilding of a network. The invention also relates to a wind farm having a plurality of wind power installations, which wind farm is used in such a method for controlling the rebuilding of a network.

Description of the Related Art

An electrical supply network may be composed of a plurality of network sections. If a disturbance occurs in a network section and threatens the stability of this network section or has already resulted in an instability of this network section, it is expedient and is regularly also prescribed to disconnect this network section from the remaining electrical supply network. This means that the disturbance also does not threaten yet further parts of the electrical supply network or even the electrical supply network as a whole. In principle, however, other reasons for such disconnection of a network section from the remaining electrical supply network also come into consideration, for example maintenance or repair work. In this case, this disconnected network section is also regularly not operated or at least is not operated in a normal operating mode.

As soon as the disturbance or another reason for disconnecting this network section has ceased again, this network section should be changed to a normal operating state again as soon as possible and should be interconnected to the remaining electrical supply network again. This operation is referred to as network rebuilding. Network rebuilding therefore denotes the restarting of a network section and the reconnection to the remaining electrical supply network, in particular to at least one further, adjacent network section.

Such an operation of rebuilding a network is known in principle and is usually coordinated by the network operator who also controls, in particular, large power plants that supply the affected network section and also any switching devices for disconnecting and reconnecting the relevant network section from/to the remaining electrical supply network. If appropriate, the network operator can also control large consumers or at least connection interfaces to such consumers.

However, with an increasing proportion of decentralized production units, in particular photovoltaic installations and wind power installations, in particular wind farms, the number and/or dominance of large power plants in the electrical supply network is/are now decreasing.

Accordingly, in the case of rebuilding a network, such wind farms must be concomitantly included at least in the considerations for the rebuilding of this network. However, for the network operator, such a problem sometimes cannot be easily solved because, on the one hand, as a result of the declining proportion of large-scale power plants, the control possibilities to which the network operator has direct access are also declining. On the other hand, such decentralized production units, in particular wind power installations, also react differently in many respects than the network operator of large-scale power plants or at least large power plants is accustomed to. A particular problem which can be mentioned here is the fact that current supply capacities of a wind farm respectively decisively depend on the weather which is not influenced by the network operator.

In the priority application for the present application, the German Patent and Trademark Office researched the following prior art: DE 10 2007 035 391 A1, DE 10 2007 049 251 A1, US 2008/0118354 A1, US 2014/0297206 A1, EP 1 993 184 A1 and CN 105 846 462 A.

BRIEF SUMMARY

Provided is a method that improves the rebuilding of an electrical supply network with the aid of at least one wind farm which is connected to this electrical supply network. The method takes into account special features of a wind farm when rebuilding a network.

Provided is a method that relates to the control of the rebuilding of an electrical supply network. The electrical supply network to be controlled in this case has at least one first network section and at least one further network section. At least one wind farm is connected to the first network section and the wind farm can be controlled via a wind farm control room.

In principle, however, further wind farms may also be connected to the at least one further network section and also to the remaining electrical supply network. A plurality of wind farms may also be connected in the first network section. In this respect, the wind farm control room is not or is at least not necessarily part of the wind farm in the first network section, but can control said wind farm. The wind farm control room can also control further wind farms, at least if they are arranged in the vicinity. In this respect, the wind farm control room is a central control unit which is superordinate to a plurality of wind farms. In principle, however, the wind farm control room can also control only a single wind farm.

The first network section, to which the wind farm is thus connected, is coupled to the at least one further network section via at least one switching device. This switching device can be used to transmit electrical energy between these network sections. The at least one switching device is also set up to disconnect the first network section from the at least one further network section in the event of a fault. Such a fault event can generally be referred to as an event. In other words, the switching device therefore then disconnects the first network section from the remaining electrical supply network.

A network control station is provided for the purpose of controlling this at least one switching device. Such a network control station is usually monitored by the network operator and can control further switching devices. In this case too, it is possible, in principle, for the network control station to control only one switching device if, for example, a further switching device is far away in the network topology and, in particular, when this first network section is connected to the remaining electrical supply network only via one switching device.

The method now relates to a fault event in which a network fault acting on the first network section occurs. In particular, the network fault can also occur in the first network section. For example, an electrical short circuit can occur in the network section, which can result in a voltage dip, to name just one example. However, it also comes into consideration that an overvoltage occurs, to name a further example.

If this fault is serious enough, and only this is understood as meaning a fault event in this case, the first network section is disconnected from the at least one further network section by the at least one switching device. It also comes into consideration here, in particular, that the first network section is not only connected to the remaining electrical supply network by means of a single connection, but rather such a connection may regularly be available via a plurality of connecting points. A plurality of switching devices are then also present. The first network section can also be connected to a plurality of further network sections and a plurality of switching devices are then also accordingly present.

If this fault event occurs, the wind farm control room interchanges data with the network control station via a control room connection. Communication between the wind farm control room, which controls the at least one wind farm, and the network control station, which controls the at least one switching device, is therefore proposed here. This communication is referred to as a control room connection in this case because the network control station communicates with the control room, namely the wind farm control room, via said connection. This control room connection is a failsafe communication connection between the wind farm control room and the network control station. This control room connection can be operated independently of the electrical supply network. In particular, this control room connection can be operated even when the fault occurs in the first network section. This control room connection can be implemented, for example, using a direct line between the wind farm control room and the network control station. An uninterruptible power supply can be provided for operation. This control room connection would therefore then not be dependent on energy from the first network section and can therefore be operated even in the case of the fault in the first network section.

The wind farm also receives data from the network control station via a wind farm connection. This communication device is therefore called a wind farm connection because the network control station can transmit data to the wind farm using said connection. This wind farm connection is also provided as a failsafe communication connection between the wind farm and the network control station and can be operated independently of the electrical supply network. In particular, it can be operated even when the fault occurs in the first network section. Data can therefore also be transmitted, to be precise directly, from the network control station to the wind farm even if the first network section, to which this at least one wind farm is connected, is in a fault event.

At least one further data connection, in particular a conventional data connection, is also provided and is used to transmit further data, namely those data which are not transmitted via the control room connection and are also not transmitted via the wind farm connection. Such a conventional data connection may be, for example, a radio connection and/or a satellite connection. The practice of using generally available communication networks also comes into consideration. This at least one further data connection does not need to be failsafe. This at least one further data connection or one of these at least one further data connection exists, in particular, between the wind farm and the wind farm control room and can be referred to as a farm connection because it transmits, in particular, data relevant to the wind farm between the wind farm and the wind farm control room. The wind farm control room can control the wind farm via said connection and can receive data from the wind farm, for example current output powers or information relating to disturbances in the wind farm, for example relating to a failed wind power installation, to name just a few examples.

In the event of a fault, the method therefore proposes a particular type of communication which is specifically provided, on the one hand, as direct communication between the wind farm control room and the network control station and as direct communication between the wind farm and the network control station. It is therefore proposed, in particular, that two special communication connections are provided and are adapted to the data which are respectively transmitted between the wind farm control room and the network control station, on the one hand, and between the network control station and the wind farm, on the other hand. The respective communication connection, that is to say the control room connection, on the one hand, and the wind farm connection, on the other hand, can be adapted in this case to the particular requirements imposed on the respective data. It comes into consideration here, in particular, that the wind farm control room transmits information relating to the state of the wind farm before the fault event to the network control station. The data have therefore been collected in the wind farm control room before the fault event and can be transmitted to the network control station in the event of a fault. Accordingly, the control room connection is designed to transmit data relating to the state of the wind farm or the wind power installations. The wind farm control room can also receive data from the network control station in this case and the control room connection can accordingly be set up for such communication in two directions.

A simple desired value or command can be transmitted from the network control station, for example to the wind farm, via the wind farm connection. Accordingly, only very low requirements are imposed here on such a wind farm connection.

According to one embodiment, it is proposed that, in the event of a fault, the wind farm is changed to a network rebuilding mode by the network control station via the wind farm connection if the network fault has been eliminated or is being eliminated. If the first network section is disconnected from the remaining supply network and a voltage dip or another problem regularly also occurs in this case, the at least one wind farm is also independently disconnected from the network, namely from the first network section. The wind farm initially at least does not continue to feed in power or at least does not feed in power in a normal manner. If the fault has been eliminated, that is to say the original cause for disconnecting the first network section from the remaining supply section has been eliminated again, network rebuilding can be started. The wind farm preferably assists with such network rebuilding. For this purpose, it can be changed to a network rebuilding mode. Such a network rebuilding mode may provide, in particular, for the wind power installations to be initially changed to an operating state again and may provide for the voltage level, reactive power level and/or active power level to be offered and, if necessary, to be fed into the electrical supply network, in particular following a request from the network operator.

In other words, a network rebuilding mode for the wind farm is a mode in which the wind farm is set up to feed in power, possibly also feeds in power, namely into the first network section, but does so under special conditions and/or in a special manner.

For this purpose, provision is made for the network control station to change the wind farm to this network rebuilding mode. The network control station uses the wind farm connection for this purpose and transmits a corresponding signal from the network control station to the wind farm. This may mean, in particular, that the wind farm has a central wind farm control device which receives this signal and can therefore be controlled using this signal. In the simplest case, this is a digital signal which knows only two values, namely that of switching on the network rebuilding mode or not switching on said mode. This network rebuilding mode can therefore be achieved in a simple manner and, in particular, by means of a wind farm connection which can be implemented in a technically simple manner. As a result of the fact that the network control station uses the wind farm connection to directly transmit the corresponding signal to the wind farm for this purpose, there is no need for a functioning communication connection between the wind farm or the central wind farm control device, on the one hand, and the wind farm control room, on the other hand. This also makes it possible to achieve the situation in which a connection which is not very complicated between the network control station and the wind farm suffices to change the wind farm to the network rebuilding mode. Only the prerequisite of network failure safety also needs to be implemented only for such a simple wind farm connection. This may be considerably more cost-effective than making a complex connection, which is intended for a high data rate, between the central wind farm controller and the wind farm control room failsafe.

According to one embodiment, it is proposed that the network control station controls active power production and additionally or alternatively active power output of the wind farm to the first network section. This is carried out, in particular, by transmitting desired active power values to the wind farm via the wind farm connection. In this case, the values for the active power output which are to be fed into the first network section are preferably predefined. However, the practice of controlling the active power production thereby, namely by means of a corresponding further desired value, also comes into consideration. The active power production and the active power output are the same in the most frequent and idealized situation. However, it may be useful to provide active power production at least in the short term without feeding in this active power produced, at least without completely feeding in said power. In any case, the active power produced in excess in this case can be thermally consumed or destroyed, for example in the wind farm, for a brief moment. As a result, the ability to control the wind farm can be increased and the network operator operating the network control station has greater certainty of the available active power output.

It is proposed to use the wind farm connection for this purpose too and it is proposed, in particular, that the network control station directly controls the wind farm. In this case too, a central wind farm control device in the wind farm can be used for this purpose, to which wind farm control device the network control station therefore directly transmits these desired active power values.

In order to be able to implement this transmission using a transmission connection which is as simple as possible, provision may be made for the desired active power values to be specified in rough stages, for example the specification of 0%, 30%, 60% and 90%. A technically modest transmission connection can therefore be used for these few values. This connection can accordingly directly connect the network control station to the wind farm, in particular to the central wind farm control device, in a cost-effective manner.

According to one embodiment, it is proposed that the wind farm control room transmits, to the network control station, at least one item of information from the following list of information. This list of information contains, as an item, a value of a level of active power produced by the wind farm and/or fed into the first network section immediately before the fault event. Such an item of information may be important for the network operator and therefore for the control via the network control station since it should also be known quite precisely therefrom how much active power can be currently produced and fed in by the wind farm. This is based, in particular, on the consideration that such a fault event occurs only very briefly, for example only for a few seconds or a few minutes, for example for a maximum of five minutes or a maximum of 10 minutes. Within this short time, the power available in the wind farm on account of the prevailing wind conditions will at best change insignificantly. This last value before the fault event is therefore a very precise value of the currently available active power of the wind farm.

At the same time, the idea that the wind farm normally always currently transmits such current values of the active power which has been fed in to the wind farm control room, that is to say in a cycle of seconds, 10 seconds or at least minutes for example, is taken as a basis. This may be carried out on a conventional, more broadband communication connection than the conventional data connection mentioned. If the fault event now occurs and this conventional data connection is disrupted or interrupted, these current data transmitted last are nevertheless available in the wind farm control room and can therefore be transmitted to the network control station via the control room connection. It is therefore only necessary for the control room connection to still function during this fault event for this purpose. These data are preferably also updated continuously in the network control station even before a fault event. In that situation, even a connection in the event of a fault from the wind farm control room to the network control station via the control room connection would be unnecessary.

In any case, it is possible to achieve the situation in which at least the level of the last values of active power fed in is known in the network control station.

Additionally or alternatively, it is proposed that the wind farm control room transmits, to the network control station, an active power forecast which indicates a value or a temporal profile of a power which can be produced for a predetermined forecast period. The predetermined forecast period is, in particular, a period from the current time to a time which is approximately two to eight hours, in particular approximately four to six hours, in the future. This is also transmitted via the control room connection.

This also makes it possible to achieve the situation in which the network control station has an item of information relating to expected active power to be fed in. The network control station can therefore plan and can concomitantly use the wind farm, in particular for the upcoming network rebuilding. In this case too, communication is skillfully chosen in such a manner that the network control station in any case has this forecast information available for the predetermined forecast period even if the conventional data connection between the wind farm and the wind farm control room is disrupted or collapses if the fault event occurs.

The active power forecast may be composed of knowledge of properties of the wind farm, namely both the static properties of the wind power installations overall and knowledge of failed wind power installations, for example, on the one hand, and, in particular, a weather forecast, in particular a wind forecast, on the other hand. In other words, this active power forecast can be calculated from the forecast wind and the knowledge of the wind farm. For this purpose, information relating to such a weather forecast, in particular a wind forecast, can be received, for example, from an external unit such as a weather service and information relating to the wind farm can be received from the wind farm. The calculation can be carried out in the wind farm control room, for example.

According to one embodiment, it is proposed that the network control station transmits, to the wind farm, at least one of the following items of information:
 a signal for starting a network rebuilding mode;
 desired active power value for specifying an active power to be fed into the first network section by the wind farm;
 a desired reactive power value for specifying a reactive power to be fed into the first network section by the wind farm; and
 a desired voltage value for specifying a network voltage to be controlled in the first network section by the wind farm.

In particular, it is proposed here that this transmission from the network control station to the wind farm is carried out via the wind farm connection. For this purpose, the wind farm connection may be unidirectional. Provision may therefore be made for this wind farm connection to transmit only these few items of information from the network control station to the wind farm. The network control station can use the signal for starting the network rebuilding mode, which can also be referred to as the network rebuilding signal, to easily change the wind farm to the network rebuilding mode, as already stated above. A single data bit may suffice for this purpose.

The desired active power value also needs to be transmitted only in one direction and may likewise be restricted, in particular for network rebuilding, to the specification of a few rough values. The practice of specifying 0%, 30%, 60% and 90% as the desired active power value has already been mentioned above as an example. This may be based, for example, on the nominal power of the wind farm or on the last active power fed in by the wind farm before the fault event.

If only four values (0%, 30%, 60% and 90%) are transmitted or are available for selection, two data bits suffice to transmit this information. Eight values, for example 0%, 15%, 30%, 45%, 60%, 75%, 90% and 100%, can be selected using a further data bit, that is to say using a total of three data bits.

Provision may likewise be made, as an alternative or additionally, for a desired reactive power value for specifying a reactive power to be fed into the first network section by the wind farm to be transmitted. In this case too, provision may be made for such a desired reactive power value to be transmitted in rough steps or stages. The example mentioned for the active power also comes into consideration here, namely the practice of also transmitting only one of the values 0%, 30%, 60% and 90% as the desired reactive power value. This value may relate to the maximum reactive power which can be transmitted by the wind farm.

The network operator can therefore also thereby easily activate and control network support by the wind farm, via the network control station, by feeding in reactive power. Two data bits suffice for these four reactive power values mentioned by way of example. The network control station preferably transmits only these three values mentioned, namely a signal for starting the network rebuilding mode, a desired active power value and a desired reactive power value. If the above-described rough stages of the desired values are selected for transmission, five bits may be sufficient to transmit all of these three signals. The entire information could therefore be readily transmitted by means of a single byte and three bits would then still be available for any other purposes, for example a control bit. The practice of somewhat respectively refining the desired value for the active power and/or the desired value for the reactive power using a further bit also comes into consideration. Respectively using a further bit makes it possible to accordingly transmit twice as many values in each case.

The wind farm can therefore be easily controlled by the control station, in particular for network rebuilding. A communication connection required for this purpose fundamentally needs to comply with only minimal requirements. A unidirectional connection from the network control station to the wind farm, in particular to the central wind farm control device, preferably suffices, on which a data byte must be transmitted occasionally, for example at an interval of 1 second, 10 seconds or 1 minute.

Moreover, data security is also thereby achieved via this farm connection because such a very simple communication connection also hinders, if not even excludes, far-reaching access by unauthorized persons. If the wind farm connection makes it possible to only transmit the three values or signals mentioned, an unauthorized person who ought to have gained access can also transmit and influence at best these three values.

As a result of the fact that the network control station transmits a desired voltage value for specifying a network voltage to be controlled by the wind farm in the first network section via the wind farm connection, the network control station and therefore the network operator can also use the wind farm to specify the level of the voltage or to at least cooperate in this case. For this purpose, the network control station can specify a corresponding voltage value, namely using a desired voltage value, in a simple manner. As a result of the fact that this is carried out by the control station, this can be well coordinated together with other requirements which are likewise controlled by the network control station.

According to another embodiment, it is proposed that the wind farm control room is connected to a wind forecast device, in particular via a forecast transmission connection, and receives wind forecast values, in particular a forecast average wind speed, from the wind forecast device and buffers said values in order to possibly calculate the active power forecast therefrom. In this case, it is proposed, in particular, that the wind farm control room calculates the active power forecast. For this purpose, a wind forecast, which is received by the wind farm control room from the wind forecast device, is available to the wind farm control room. In addition, knowledge of the wind farm, for which the active power forecast is intended to be calculated, is available to the wind farm control room for this purpose. The wind farm control room can then easily transmit the result to the network control station either generally or only in the event of a fault if the network control station needs this active power forecast to control the wind farm for network rebuilding. Such a wind forecast device may be a weather service, for example.

According to one embodiment, it is proposed that the wind farm connection is unidirectional and data are only transmitted in the direction from the network control station to the wind farm. In particular, they are transmitted only from the network control station to the central wind farm control device. Moreover, this principle of operation is also preferably used for a plurality of wind farms in the same first network section. As a result of this use of a unidirectional wind farm connection, the latter can be formed in a simple manner. Only a few items of data need to be transmitted and two-way communication between the network operator and the wind farm also does not need to be carried out. It may suffice that the wind farm can receive and evaluate the few items of data transmitted by the network control station. If so little is transmitted that the transmission of one byte is sufficient for all information, as described above, it may be sufficient if the network control station can generate and transmit this byte and the wind farm or the central wind farm control device can decrypt this one byte.

Additionally or alternatively, it is proposed that the wind farm connection has a low bandwidth or a low transmission rate. In particular, it may be sufficient if at most one byte per second, preferably at most one byte in 10 seconds and, in particular, preferably one byte in one minute can be transmitted. Accordingly, it suffices if the transmission connection, in particular a corresponding transmission line and/or a corresponding radio connection, can ensure such a transmission rate or bandwidth. It is also not necessarily detrimental if more can be transmitted, but it is not necessary for more to be able to be transmitted.

The control room connection is preferably bidirectional and data are transmitted in both directions between the network control station and the wind farm control room. The control room connection, that is to say the connection between the farm control room and the network control station, can therefore be configured to be more complicated than the wind farm connection. Accordingly, more data and more complex data can be transmitted via the control room connection. Such a control room connection can accordingly also be considerably more complex and therefore also more expensive than the wind farm connection.

As a result of the proposed structure, in particular the use of a simple, in particular unidirectional, wind farm connection, on the one hand, and the use of a more complex control room connection, on the other hand, it is possible to supply the network control station with sufficient data and in the process to also achieve bidirectional communication between the network control station and the wind farm control room, on the one hand, but to avoid costly further connections, on the other hand. Nevertheless, each wind farm can be advantageously directly controlled by a corresponding network control station. It is also not necessary to maintain a communication connection between the wind farm control room and the wind farm for the fault event. In particular, it is possible to use a conventional data connection there which is accordingly more cost-effective and need not be made failsafe.

According to one embodiment, it is proposed that data for controlling the wind farm are stored in the network control station. Additionally or alternatively, it comes into consideration that these data are stored in the wind farm control room and, in the event of a fault, can be transmitted to the network control station via the control room connection. These data are selected from the following list. The data therefore relate to at least one element, to some elements or to all elements in the following list having the following elements:

an active power forecast;
a wind speed forecast;
characteristic data of the wind farm, in particular nominal power, nominal reactive power and/or power gradients, which indicate a maximum active power change in the farm; and
an available active power of the wind farm.

An active power forecast can therefore always be available in the network control station either because it is stored there or because it can be obtained from the wind farm control room via the failsafe control room connection. If a fault event therefore then occurs and some other data connections could be disrupted or could have collapsed, the network control station nevertheless has access to this active power forecast and therefore knows what active power can be produced and fed in by the wind farm in the near future, in particular in the next two to eight, in particular four to six, hours and can use these data to control network rebuilding.

A wind speed forecast may likewise be available for the network control station and may also be used to determine an active power forecast. This active power forecast can then be accordingly created in the wind farm control room or directly in the network control station. As a result, an active power forecast can also be available to the network control station even in the event of a fault.

Additionally or alternatively, the network control station has access to characteristic data of the wind farm. The network control station can also use said data for network rebuilding with the aid of the at least one wind farm. If necessary, the network control station can determine an active power forecast from the characteristic data of the wind farm and a wind speed forecast, or this determination is carried out in the wind farm control room, from which a transmission to the network control station can be carried out via the control room connection even in the event of a fault.

The characteristic data of the wind farm are, in particular, the nominal power, nominal reactive power or a power gradient. An active power forecast can be calculated, in particular with the nominal power, using the knowledge of a wind forecast. In a similar manner, a possible adjustable reactive power can be determined from the nominal reactive power and a weather forecast or an active power forecast. For example, the reactive power may depend, on the one hand, on the active power which can be produced by virtue of the fact that, specifically in the case of more active power, that is to say if wind is accordingly present, more reactive power can also be produced. However, a current which can be fed in is limited at the same time and must be divided between the active power and reactive power to be fed in. If, for example, active power has thus already been fed in at high power, only less reactive power can be regularly fed in, in which case this depends on the dimensioning of the supply line and, in particular, the network connection point.

The network control station can better plan its network rebuilding using the knowledge of the power limiting gradient since it is possible to take into account how quickly the active power of the wind farm can be increased, in particular when feeding in power. This can be taken into account and, as a result, the network control station, for example, and therefore the network operator can better estimate how long it will be before a required active power is available in the first network section, with the result that the first network section can be connected to the remaining supply network again by the at least one switching device.

Additionally or alternatively, it is proposed that an available active power of the wind farm is stored. With this information, the network control station, and therefore the network operator, immediately has information relating to the active power currently available. This may be, for example, the last active power fed in by the wind farm before the fault event if this fault event lasted only for a very short time, for example a few seconds.

Some, a plurality of or all of the stored data are preferably updated frequently, in particular continuously or quasi-continuously. This achieves the situation, in particular, in which, in the event of a fault, if updating can then no longer take place on account of a disturbance or communication interruptions, the last current values are available and are also stored in the wind farm control room for the network control station. In other words, provisions for a network fault event can be made as a result of this continuous or at least frequent updating. In this case, quasi-continuous updating should be understood as meaning the fact that continuous updating is carried out within the scope of the technical possibilities. Updating, and many other data transmission processes, is/are carried out in a digital manner, in particular, and continuous updating is then updating which can be carried out as digital updating as often as technically possible with the device used.

According to one embodiment, it is proposed that, in the event of a fault, the wind farm is changed to a network rebuilding mode and the wind farm carries out one, a plurality of or all of the following steps in the network rebuilding mode, namely:

activating a reserve power, wherein the reserve power is a power which can be fed into the first network section by the wind farm in response to a request signal;

feeding electrical active power into the first network section on the basis of a frequency of the electrical voltage while the network rebuilding mode prescribes frequency-dependent active power control;

feeding in electrical active power while complying with a power gradient, which is limited in terms of the absolute value and describes a change in the active power on the basis of time, while the network rebuilding mode prescribes active power control with a fixed gradient; and feeding electrical reactive power into the first network section on the basis of a voltage while the network rebuilding mode prescribes voltage-dependent reactive power feeding.

It is therefore proposed to first of all initiate such a network rebuilding mode. This is preferably carried out by the network control station via the wind farm connection. This network rebuilding mode can then be implemented and coordinated in the wind farm by means of the central wind farm control device.

The proposed activation of a reserve power means that the wind farm, that is to say, in particular, its wind power installations or some of said installations, is/are started up and also already rotate to such an extent that this reserve power can be activated in a very brief moment and can be fed into the network, that is to say the first network section here. In the simplest case, this means that the wind power installations already produce these powers and this power is merely consumed, in particular is thermally consumed by the electrical resistors. However, the situation in which the respective wind power installation is brought only to a rotational speed and produces power for its own supply also comes into consideration. For retrieval, this operation can then be changed in such a manner that the rotor blades are rotated into the wind in such a manner that they take power from the wind, namely considerably more than before. In this case, although the power cannot be retrieved immediately, it can be retrieved very quickly since rotor blades can be rotated into the wind in a few seconds.

Provision may then be made for electrical active power to be fed in on the basis of a frequency of the electrical voltage in the first network section, in which case this is carried out only or in particular when frequency-dependent active power control is prescribed in the network rebuilding mode. A special control mode is therefore activated within network rebuilding and predetermined frequency-dependent active power feeding is carried out in said mode.

Electrical active power can be fed in while complying with a power gradient which is limited in terms of the absolute value. In this case, provision can therefore be made for the active power to change only within predefined limits. This makes it possible to achieve a certain stability of the active power change. In particular, this makes it possible to counteract soaring which can constitute a risk in a comparatively unstable network rebuilding state. In this case, this feeding and compliance with the power gradient are carried out only if a corresponding mode is switched on, namely active power control with a fixed gradient. This is prescribed and power is then accordingly fed in with a limited power gradient. Such modes, namely the frequency-dependent feeding and the active power control with a fixed gradient, can also be combined. In particular, it is proposed that a combination is such that frequency-dependent active power feeding is carried out as long as it is within the limits predefined by the gradients.

Provision may also be made for electrical reactive power to be fed in on the basis of a voltage in the first network section. This mode is also intended to be selected if it is accordingly prescribed as voltage-dependent reactive power feeding. Moreover, these rules can also be currently specified by the network operator via the network control station thereof. Alternatively, there are network states which are captured by the wind farm or the central wind farm control device and these modes are selected on the basis thereof. In particular, frequency-dependent active power control and/or active power control with a fixed gradient and/or voltage-dependent reactive power control is/are therefore selected on the basis thereof.

Provided is an apparatus intended to control the rebuilding of an electrical supply network. The underlying electrical supply network has a first network section and at least one further network section. At least one wind farm is connected to the first network section and the wind farm can be controlled via a wind farm control room. The first network section is coupled to the at least one further network section via at least one switching device in order to transmit electrical energy between the network sections, and the at least one switching device is set up to disconnect the first network section from the at least one further network section in the event of a fault.

A network control station is provided for the purpose of controlling the switching device, in which case, for a fault event during which a network fault acting on the first network section occurs, provision is made for the first network section to be disconnected from the at least one further network section by means of the switching device. For this purpose, the communication apparatus comprises a control room connection which is set up to be used by the wind farm control room to interchange data with the network control station, wherein the control room connection is a failsafe communication connection between the wind farm control room and the network control station and can be operated in a manner independent of the electrical supply network, in particular can be operated even in the case of the fault in the first network section.

A wind farm connection is also provided and is set up to be used by the wind farm to receive data from the network control station, wherein the wind farm connection is a failsafe communication connection between the wind farm and the network control station and can be operated independently of the electrical supply network, in particular can be operated even in the case of the fault in the first network section. A further data connection is also provided and is provided at least between the wind farm and the wind farm control room. Such a data connection provided between the wind farm and the wind farm control room can be referred to as a farm connection. This further data connection is used to transmit, in particular, further data which are not transmitted via the control room connection and are not transmitted via the wind farm connection. The further data connection can be provided, in particular, as a conventional data connection. Provision may also be made for further data connections to be present, which further data connections are provided, for example, between a wind farm control room and a forecast device.

The communication apparatus operates in the manner described above with reference to embodiments of the method for controlling the rebuilding of a network.

The communication apparatus preferably comprises the wind farm control room and additionally or alternatively the network control station and also additionally or alternatively a wind farm control device of the wind farm and also or alternatively a wind forecast device for creating a wind forecast.

The communication device is preferably set up to carry out a method according to one of the embodiments described above. In particular, the communication device is set up to carry out the communication processes described there, in particular to transmit said data from the network control station to the wind farm via the wind farm connection and/or to interchange said data between the wind farm control room and the network control station via the control room connection.

The wind farm connection is preferably unidirectional and is set up to operate in the manner described according to one of the corresponding embodiments of the method for controlling the rebuilding of a network.

According to another embodiment, the control room connection is bidirectional and is set up to transmit data in both directions between the network control station and the wind farm control room. In particular, the control room connection is designed to operate in the manner described according to corresponding embodiments of a method for controlling the rebuilding of a network.

Provided is a wind farm. The latter has a central wind farm control device which can be used to control wind power installations in the wind farm and which can communicate with the outside. This wind farm control device is set up to receive data from a network control station via a unidirectional wind farm connection. In particular, it operates in the manner described in connection with embodiments of the method for controlling the rebuilding of a network. In particular, it operates or is set up for communication or data interchange, as described in connection with data transmission from the network control station to the wind farm or to the central wind farm control device.

The wind farm, and therefore the central farm control device, is preferably set up to be incorporated in a communication apparatus according to at least one embodiment of a communication apparatus. In particular, the central farm control device is connected to the control station via a described wind farm connection and is connected to the wind farm control room via a further data connection, in particular via a farm connection.

BRIEF DESCRIPTION OF THE SEVERAL VIEWS OF THE DRAWINGS

The invention is now described in more detail below, by way of example, on the basis of embodiments with reference to the accompanying figures.

DETAILED DESCRIPTION

Figure 1:
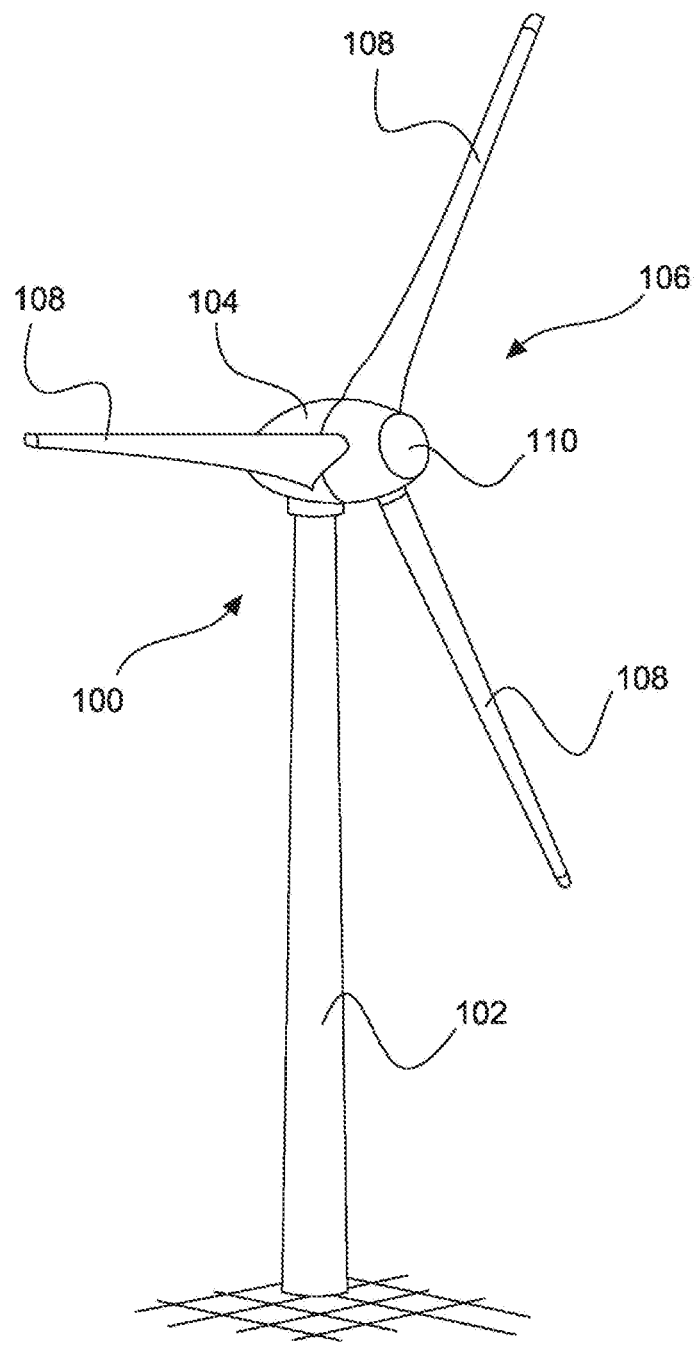
FIG. 1 shows a perspective illustration of a wind power installation.

FIG. 1 shows a wind power installation 100 having a tower 102 and a nacelle 104. A rotor 106 having three rotor blades 108 and a spinner 110 is arranged on the nacelle 104. The rotor 106 is caused to rotate by the wind during operation and thereby drives a generator in the nacelle 104.

Figure 2:
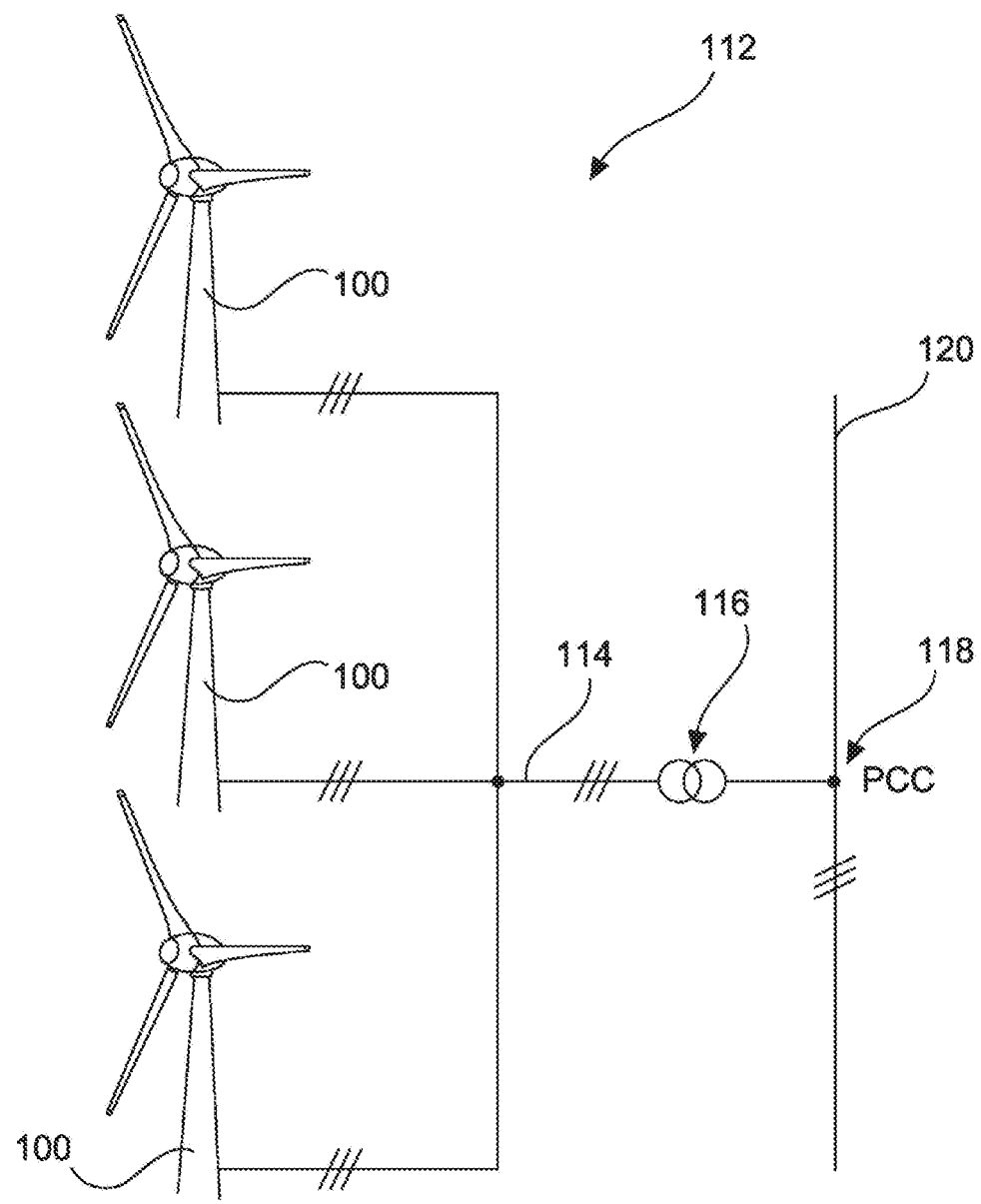
FIG. 2 shows a schematic illustration of a wind farm.

FIG. 2 shows a wind farm 112 having, by way of example, three wind power installations 100 which may be identical or different. The three wind power installations 100 are therefore representative of fundamentally any desired number of wind power installations in a wind farm 112. The wind power installations 100 provide their power, namely the current produced in particular, via an electrical farm network 114. In this case, the currents or powers respectively produced by the individual wind power installations 100 are added and a transformer 116 is usually provided, which transformer steps up the voltage in the farm in order to then feed it into the supply network 120 at the feed-in point 118, which is also generally referred to as the PCC (Point of common coupling). FIG. 2 is only a simplified illustration of a wind farm 112 which does not show a controller, for example, even though a controller is naturally present. The farm network 114 may also be configured differently, for example, by virtue of a transformer also being present at the output of each wind power installation 100, for example, to name just one other exemplary embodiment.

Figure 3:
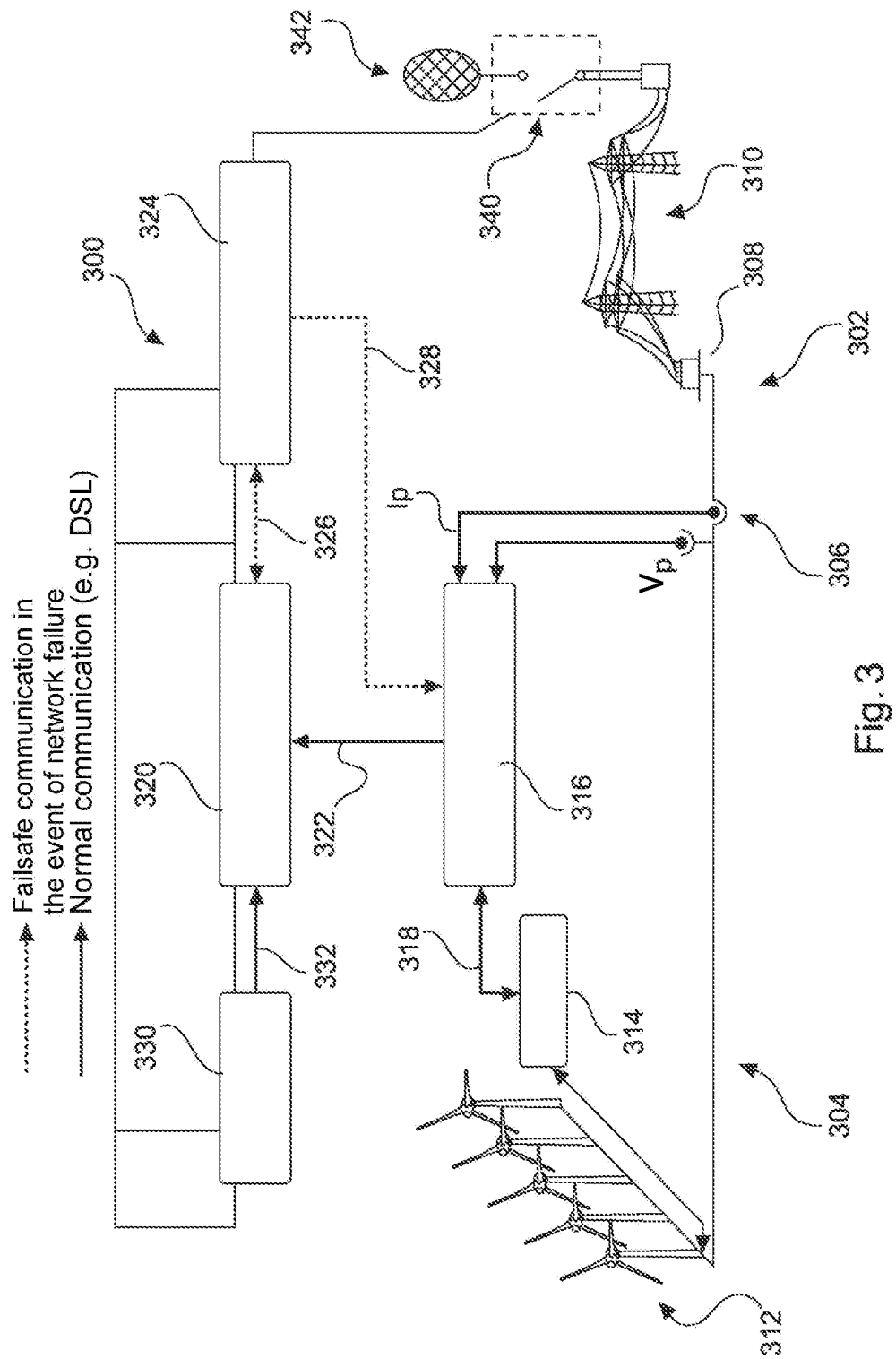
FIG. 3 shows a communication apparatus.

FIG. 3 shows a communication apparatus 300 which is embedded in a first network section 302. A wind farm 304 is connected to this first network section 302 via a network connection point 306. The first network section 302 is part of an electrical supply network and is connected to at least one further network section 342 via a switching device 340. In this respect, the first network section 302 is symbolized by a high-voltage transformer 308 and a high-voltage line 310.

The wind farm 304 has a plurality of wind power installations 312 which can be controlled via a control computer 314. A central wind farm control device 316 is also provided and can communicate with the control computer 314 via an interchange line 318. In another embodiment, the control computer 314 can also be part of the central wind farm control device 316.

In any case, the central wind farm control device, which can also be referred to as an FCU (Farm Control Unit) for reasons of simplification, captures a farm-side voltage $V_p$ and a farm-side feed-in current $I_p$ at the network connection point 306 or, on the wind farm side, in the vicinity of the network connection point 306. As a result, the central farm control device 316 can capture and evaluate current and voltage at the network connection point, namely on the farm side in particular, that is to say toward the wind farm 304. On the basis of this evaluation, the central wind farm control device can control the wind farm, namely the wind power installations 312, in particular. In this case, values can also be captured and evaluated by the wind power installations 312. Such values may respectively be the active power or reactive power which is currently output and/or can be output by the relevant wind power installation 312. Such values may also relate to state information relating to the wind power installation, in particular disturbance or fault signals.

The central wind farm control device 316 also provides a wind farm control room 320 with such data or with other data. A data connection 322, which is also referred to here as a farm connection 322, is used, in particular, for this purpose and is used, in particular, to transmit the current feed of the wind farm 304 and the availability of the wind farm 304. In this case, the availability of the wind farm is, in particular, an item of information relating to the available active power of the wind farm. Characteristic data relating to the wind farm, in particular the nominal power of the wind farm and additionally or alternatively the nominal reactive power of the wind farm and additionally or alternatively power limiting gradients, which indicate a maximum active power change in the farm, are preferably also transmitted. These data are preferably buffered in the wind farm control room 320 and can be retrieved if necessary.

The wind farm control room 320 also communicates with a network control station 324 and this communication takes place via a control room connection 326. This control room connection 326 and the communication between the wind farm control room 320 and the network control station 324 are provided, in particular, for a network rebuilding situation, namely if the first network section 302 has been disconnected from a further network section and has therefore been disconnected overall from the remaining electrical supply network. This is usually also coupled to a collapse of the first network section 302 or at least to a voltage dip in this first network section 302, to name a situation which can be expected most often.

For this purpose in particular, it is proposed that the network control station 324 receives values from the wind farm control room 320. These include, in particular, values of the last feed before this event or the fault event or the disconnection of the first network section from at least one further network section or an associated voltage dip in this first network section. It is therefore proposed to obtain the last values of the feed of the wind farm 304 up to this event. This is, in particular, the last active power feed, in terms of level, before the occurrence of said event. These values can therefore be provided by the wind farm control room 320 even if, in the case of the event, the data connection 322, which can also be referred to as a further data connection 322, has collapsed. This is because these data have already been previously transmitted, as a precaution, from the central wind farm control device 316 to the wind farm control room 320. It should be noted in this case that further wind farms, that is to say, in particular, further central wind farm control devices of further wind farms, can also be connected to the wind farm control room 320.

It is also proposed that the network control station 324 receives a forecast from the farm control room 320 via the control room connection 326, namely, in particular, an active power forecast which indicates how much active power can be provided, that is to say can be produced and also fed in, by the relevant wind farm 304 in the future, in particular in the coming hours, in particular in the coming six hours; this can also be carried out for a plurality of wind farms. For example, a forecast value of the active power which can be provided can be provided for each farm every 15 minutes for this exemplary period of six hours.

In this case, the control room connection 326 is provided as a failsafe communication connection. An uninterruptible power supply (UPS) can be provided for this purpose, for example, in order to also be able to still operate in the event of a network failure. In this case, the control room connection 326 may also be dimensioned in such a manner that it can transmit one kilobyte for each wind farm, for example, with regard to which information is interchanged. Such a failsafe control room connection 326 may be comparatively costly but is provided only between the network control station 324 and the wind farm control room 320. In particular, if a plurality of wind farms are provided and are all connected to the same wind farm control room 320, this means that only such a control room connection 326 must be provided between the wind farm control room 320 and the network control station 324.

The network control station 324 is also connected to the wind farm 304 via a wind farm connection 328. In this case, the connection leads to the central wind farm control device 316. If a plurality of wind farms are present, a plurality of these wind farm connections 328 are also required, namely one wind farm connection 328 for each wind farm.

However, a very cost-effective wind farm connection 328 is proposed here for this purpose. This is because said connection is unidirectional and only transmits data from the network control station 324 to the central wind farm control device 316. It is proposed here, in particular, that an activation signal for activating a network rebuilding mode is transmitted. An individual bit suffices for such transmission of information. The practice of transmitting desired active power values from the network control station 324 to the central wind farm control device 316 via the wind farm connection 328 for the purpose of controlling active power is also proposed. All of this data transmission is also provided for a network rebuilding situation. For such a network rebuilding situation, it was recognized that that the wind farm power which can be provided by the wind farm can be taken into account in rough steps. It may therefore suffice if only a few possible values can be selected, for example 0%, 30%, 60% and 90% of the nominal power of the wind farm. Accordingly, only these four values also need to be identifiable and four values can be identified using two bits.

In any case, only a few bits are needed for this task and, as a result, this wind farm connection 328 can be established in a cost-effective manner, at least in a considerably more cost-effective manner than the control room connection 326. As a result, it also becomes possible to respectively provide a wind farm connection 328 from the one network control station 324 to a plurality of wind farms at reasonable expense.

A forecast device 330 which creates weather forecasts and may be a weather service, for example, is also additionally provided. A special forecast service for expected wind, which can also use a forecast model for example, also comes into consideration. This wind forecast device 330 is connected to the wind farm control room 320 via a connection device 332 and the connection apparatus may also be one of the further data connections proposed. In particular, the wind forecast device 330 transmits corresponding wind data and possibly further weather data to the wind farm control room 320 via this connection device 332. The wind farm control room can use this weather information and information relating to characteristic data of the wind farm 304, which has been received by the wind farm control room 320 from the central wind farm control device, to calculate active power forecasts and can provide the network control station 324 with these forecasts if appropriate. For this purpose, it may be expedient, for example, and it is hereby proposed that data are provided for a forecast of several hours, in particular for a six-hour forecast, so that the wind farm control room 320 can also calculate an active power forecast of accordingly several hours and can make it available to the network control station 324.

The communication apparatus 300 therefore comprises at least the control room connection 326 and the wind farm connection 328. It may also comprise the further data connection 322 between the central wind farm control device 316 and the wind farm control room 320. In addition, the connection device 332 may also be part of the communication apparatus 300.

The many communication connections, in particular the interchange line 318, the further data connection 322, the control room connection 326, the wind farm connection 328 and the connection device 332, are illustrated substantially as a line in FIG. 3. It actually also comes into consideration, on the one hand, that the connections, in particular the further data connection 322 or the farm connection 322, and the connection device 332 transmit data via a radio path. In addition, such communication connections comprise not only the transmission paths illustrated, whether wired or wireless, but also the corresponding transmission and reception apparatuses. The transmission and/or reception apparatuses are accordingly provided in the devices which are connected there. In particular, these are provided in the control computer 314, the central wind farm control device 316, the wind farm control room 320, the network control station 324 and the wind forecast device 330. Optionally, the control computer 314 and/or the central wind farm control device 316 and/or the wind farm control room 320 and/or the network control station 324 and/or the wind forecast device 330 is/are part of the communication apparatus.

It has therefore been recognized that the network operational management strategy and the associated communication infrastructure have previously been oriented to the physical properties of conventional suppliers, in particular large power plant units. For improvement, a proposal for integrating wind power installations in the control technology of the network operators is made.

It has previously been the case that, in a network rebuilding situation, the network operator building the network needed a communication interface to control all power plants and the secondary technology in the network thereof and to query the status of the power plants. It was recognized that, in future, the networks will be built not only with conventional power plants but rather that it is advantageous that the wind farms can also be addressed in future by the network operator via a communication interface which is protected against power failures in the case of a blackout. Furthermore, it is advantageous in this case if the available power during the entire network rebuilding is known to the network operator in a network rebuilding situation in a substation-acute manner, that is to say in each case based on a substation.

For the solution, a communication interface between the network operator and the wind farm is proposed, in particular, which communication interface remains operational in a network rebuilding situation and transmits necessary signals.

This makes it possible to take into account an increase in the converter-based production share in integrated networks. The proposed solution also supports a control concept for networks which are occasionally almost completely operated by converter-coupled feeding while maintaining the system reliability.

It has been recognized that it would be advantageous if a wind farm in future could interchange the following information or at least some of it with the network operator in a network rebuilding situation:
1. power last fed in and status of the wind farm;
2. forecast power for the next 6 hours;
3. information which can be used by the network operator to change the wind farm to a network rebuilding mode;
4. information which can be used by the network operator to control active power to be output by the wind farm, in which case it is possible to choose between the values of 0%, 30%, 60%, 90%, for example; and
5. information which can be used by the network operator to adjust parameters for reactive power, in particular the parameters of desired voltage value, desired reactive power value and/or cos(Phi).

According to at least one embodiment of the invention, a division into two communication paths is proposed, namely in particular:
1. Failsafe bidirectional communication between the wind farm control room and the network control station. The network control station can be operated, in particular, by a network operator and/or a transmission network operator.
   This bidirectional communication can be referred to as a control room connection. It is preferably in the form of a dedicated line for transmitting data and voice and is failsafe even in the event of a total network failure.
2. Failsafe unidirectional communication between the network operator and the wind farm. This unidirectional communication can be referred to as a wind farm connection. It is preferably in the form of low-speed communication and has a data rate of a few bits per second. In this case, the data rate is considered to be a maximum of 8 bytes per second, preferably a maximum of one byte per second, and in particular a maximum of one bit per second, in particular no more than 20 bits per second (bit/s).

The data can be transmitted, for example, using known ripple control signals or using a simple GSM (Global System for Mobile Communications) or another radio connection. The practice of using a failsafe interface of a known feed management system also comes into consideration. Such an interface is also known under the term EISMAN interface.

Continuous holding of a data record for all wind farms is also proposed, in which case the network operator can retrieve this data record if necessary via a failsafe connection. Alternatively, it is proposed that such data or such a data record is/are continuously available from the network operator, in particular in a network control station.

Such a second, very simple unidirectional communication path allows the wind farms to be controlled by the network operator.

It has been recognized that the following advantages may arise, in particular. The data connection with a greater data requirement must be provided only once. The interface to the wind farms may be very simple.

Such a proposed communication structure can be advantageously used. In the case of a network rebuilding situation, the network operator first retrieves the data from the wind farm control room by means of the network control station thereof.

After a fault event and after the network operator, in particular by means of the network control station, has connected a network voltage to the wind farm again, the conventional communication, in particular via DSL (Digital Subscriber Line), to a corresponding wind farm may not be available under certain circumstances.

However, the network operator can then change the wind farm to the network rebuilding mode via a very simple interface. In this case, activation of a reserve power, frequency-dependent power control and control with a fixed gradient and also voltage-dependent reactive power control can be carried out, in particular. The network operator can therefore control the power via this interface in order to start up the network again.

As a result of the knowledge of the available power in combination with the power control, the network operator then knows the behavior of the wind farms and can start up the network very quickly with the support of the wind farm or a plurality of wind farms.

This interface can additionally also be used to control the reactive power by virtue of a desired voltage value or a desired reactive power value being transmitted via said interface, namely via the wind farm connection.

The following types of communication fundamentally come into consideration:

So-called PLC (Power-line communication), which can also be referred to as point-to-point power line communication. The use of known ripple control signals which operate in a unidirectional manner. Transmission by radio and/or coupling into an existing line comes into consideration.

Other radio connections, in particular the use of telephone network operators and/or a GSM, also come into consideration.

The invention claimed is:

1. A method for controlling a rebuilding of an electrical supply network, wherein the electrical supply network comprises a first network section and a second network section, wherein:
   a wind farm is connected to the first network section,
   the wind farm is configured to be controlled via a wind farm control room,
   the first network section is coupled to the second network section via at least one switching device to transmit electrical energy between the first and second network sections,
   the at least one switching device is configured to disconnect the first network section from the second network section, and
   a network control station is configured to control the at least one switching device,
   wherein, in the event of a fault occurring in the first network section, the method comprises:
   disconnecting the first network section from the second network section by the at least one switching device,
   interchanging data between the wind farm control room and the network control station via a control room connection, wherein the control room connection provides a communication connection between the wind farm control room and the network control station that is configured to be operated independently of the electrical supply network,
   receiving data at the wind farm from the network control station via a wind farm connection, wherein the wind farm connection provides a communication connection between the wind farm and the network control station that is configured to be operated independently of the electrical supply network, and
   transmitting data that was not transmitted via the control room connection or the wind farm connection via a data connection so long as the data connection has not failed.

2. The method as claimed in claim 1, further comprises changing the wind farm to a network rebuilding mode by the network control station via the wind farm connection if the fault has been eliminated or is being eliminated.

3. The method as claimed in claim 1, wherein the network control station controls at least one of: active power production or output of the wind farm, by transmitting desired active power values to the wind farm via the wind farm connection.

4. The method as claimed in claim 1, wherein the wind farm control room transmits, to the network control station, at least one item of information from the list containing:
   a value of a level of active power produced by the wind farm,
   a value of a level of active power fed into the first network section before the fault, or
   an active power forecast indicating a value or a temporal profile of a power which can be produced for a predetermined forecast period, wherein the predetermined forecast period describes a period from the current time to a time which is approximately 2 to 8 hours in the future, wherein the at least one item of information is transmitted via the control room connection.

5. The method as claimed in claim 1, wherein the network control station transmits, to the wind farm, via the wind farm connection, at least one item of information from the list containing:
   a signal for starting a network rebuilding mode,
   a desired active power value for specifying an active power to be fed into the first network section by the wind farm,
   a desired reactive power value for specifying a reactive power to be fed into the first network section by the wind farm, or
   a desired voltage value for specifying a network voltage to be controlled in the first network section by the wind farm.

6. The method as claimed in claim 1, wherein the wind farm control room is connected to a wind forecast device, and receives wind forecast values from the wind forecast device.

7. The method as claimed in claim 1, wherein the wind farm connection is unidirectional and data are only transmitted in a direction from the network control station to the wind farm.

8. The method as claimed in claim 1, wherein the control room connection is bidirectional and data are transmitted in both directions between the network control station and the wind farm control room.

9. The method as claimed in claim 1, wherein data for controlling the wind farm are stored in the network control station or the wind farm control room and, in the event of the fault, are transmitted to the network control station via the control room connection, wherein the data includes data selected from the list containing:
   an active power forecast,
   a wind speed forecast,
   characteristic data of the wind farm, wherein the characteristic data is at least one of: nominal power, nominal reactive power, or power limiting gradients, and
   an available active power of the wind farm.

10. The method as claimed in claim 9, wherein at least some of the stored data are updated continuously.

11. The method as claimed in claim 1, wherein in the event of the fault, the wind farm is changed to a network rebuilding mode and the wind farm carries out at least one of the following steps in the network rebuilding mode:
  activating a reserve power, wherein the reserve power is a power configured to be fed into the first network section by the wind farm in response to a request signal,
  feeding in electrical active power based on a frequency of an electrical voltage in the first network section while the network rebuilding mode prescribes frequency-dependent active power control,
  feeding in electrical active power while complying with a power gradient, which is limited in terms of an absolute value and describes a change in the electrical active power based on time, while the network rebuilding mode prescribes active power control with a fixed gradient, and
  feeding in electrical reactive power based on a voltage in the first network section while the network rebuilding mode prescribes voltage-dependent reactive power feeding.

12. A communication apparatus for controlling a rebuilding of an electrical supply network, wherein the electrical supply network has a first network section and a second network section, wherein:
  a wind farm is connected to the first network section,
  the wind farm is configured to be controlled via a wind farm control room,
  the first network section is coupled to the second network section via at least one switching device to transmit electrical energy between the first and second network sections,
  the at least one switching device is configured to disconnect the first network section from the second network section in the event of a fault, and
  a network control station configured to control the at least one switching device,
  wherein, for a fault event during which a network fault acting on the first network section occurs, provision is made for the first network section to be disconnected from the second network section by the at least one switching device, the communication apparatus comprising:
    a control room connection configured to be used by the wind farm control room to interchange data with the network control station,
    a wind farm connection between the wind farm and the network control station, and
    a data connection between the wind farm and the wind farm control room, wherein:
      the control room connection provides a communication connection between the wind farm control room and the network control station that is configured to be operated independently of the electrical supply network, even in the event of a fault in the first network section,
      the wind farm connection is configured to be used by the wind farm to receive data from the network control station,
      the wind farm connection provides a communication connection between the wind farm and the network control station that is configured to be operated independently of the electrical supply network, even in the event of the fault in the first network section, and
      the data connection is configured to transmit data which are not transmitted via the control room connection and the wind farm connection.

13. The communication apparatus as claimed in claim 12, wherein the wind farm control room and the network control station form part of the communication apparatus, the communication apparatus further comprising:
  a wind farm control device of the wind farm, and
  a wind forecast device for creating a wind forecast.

14. A communication apparatus configured to carry out the method as claimed in claim 1.

15. The communication apparatus as claimed in claim 12, wherein the wind farm connection is unidirectional such that data are only transmitted in a direction from the network control station to the wind farm.

16. The communication apparatus as claimed in claim 12, wherein the control room connection is bidirectional and is set up such that data are transmitted in both directions between the network control station and the wind farm control room.

17. A wind farm comprising:
  a central wind farm control device configured to perform the method of claim 1 and receive data from the network control station via a unidirectional wind farm connection.

18. A wind farm comprising a central wind farm control device incorporated in the communication apparatus as claimed in claim 12.

19. The method as claimed in claim 1, wherein the wind farm connection has a transmission rate that is less 8 bytes per second.

20. The method as claimed in claim 6, wherein the wind forecast values include a forecast average wind speed, wherein the method further comprises buffering the wind forecast values to calculate an active power forecast.

* * * * *